(12) United States Patent
Kim et al.

(10) Patent No.: US 10,035,490 B2
(45) Date of Patent: Jul. 31, 2018

(54) ACTIVE HOOD LATCH DEVICE FOR VEHICLE

(71) Applicants: Hyundai Motor Company, Seoul (KR); Kia Motors Corporation, Seoul (KR); PYEONG HWA AUTOMOTIVE CO., LTD., Daegu (KR)

(72) Inventors: Sang Il Kim, Seoul (KR); Seong Tae Hong, Suwon-si (KR)

(73) Assignees: Hyundai Motor Company, Seoul (KR); Kia Motors Corporation, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 114 days.

(21) Appl. No.: 14/101,087

(22) Filed: Dec. 9, 2013

(65) Prior Publication Data

US 2015/0054293 A1    Feb. 26, 2015

(30) Foreign Application Priority Data

Aug. 20, 2013    (KR) .................. 10-2013-0098213

(51) Int. Cl.
    *E05B 65/10*    (2006.01)
    *B60R 21/38*    (2011.01)
    (Continued)

(52) U.S. Cl.
    CPC ............ *B60R 21/38* (2013.01); *B60R 21/013* (2013.01); *B60R 21/0136* (2013.01);
    (Continued)

(58) Field of Classification Search
    CPC . Y10T 292/0908; B60R 21/38; B60R 21/013; B60R 21/0136; B60R 2021/346; E05B 77/08; E05B 81/08; E05C 1/08
    (Continued)

(56) References Cited

U.S. PATENT DOCUMENTS 2,246,789 A  *  6/1941  Dall ................... E05B 83/16
                                                    292/117
2,246,793 A  *  6/1941  Dall ............................ 292/11
(Continued)

FOREIGN PATENT DOCUMENTS

CN        1669849 A      9/2005
CN        1672988 A      9/2005
(Continued)

*Primary Examiner* — Kristina Fulton
*Assistant Examiner* — Faria Ahmad
(74) *Attorney, Agent, or Firm* — Morgan, Lewis & Bockius LLP (57) ABSTRACT

An active hood latch device for a vehicle may actively reduce a pedestrian injury value by uniformly lifting up a front end portion of a hood of the vehicle by directly popping up a striker in case of a pedestrian collision accident. Such an active hood latch device may include an actuator for generating power for lifting up a striker locked by a passive latch, an actuator cooperating portion installed to connect the striker with the actuator and to lift up the striker in cooperation with the actuator when the actuator operates, and an electronic controller for operating the actuator upon receiving a sensing signal from a collision sensor that senses pedestrian collision.

9 Claims, 6 Drawing Sheets

(51) Int. Cl.
*B60R 21/013* (2006.01)
*B60R 21/0136* (2006.01)
*E05C 1/08* (2006.01)
*E05B 77/08* (2014.01)
*E05B 81/08* (2014.01)
*E05C 19/10* (2006.01)
*E05C 3/06* (2006.01)
*E05C 3/04* (2006.01)
*B60R 21/34* (2011.01)

(52) U.S. Cl.
CPC .............. *E05B 77/08* (2013.01); *E05B 81/08* (2013.01); *E05C 1/08* (2013.01); *B60R 2021/346* (2013.01); *Y10T 292/0908* (2015.04)

(58) Field of Classification Search
USPC ......... 180/274, 271, 69.21; 292/92, 95, 116, 292/121, 117, 119, 96, 99, 102, 201, 216, 292/194, 213, 214, 229, 195, 198, 202, 292/203, DIG. 14, 341.15, 341.16; 296/187.09
See application file for complete search history.

(56) References Cited

U.S. PATENT DOCUMENTS

| | | | |
|---|---|---|---|
| 2,877,038 A * | 3/1959 | Kramer | 292/216 |
| 3,905,624 A * | 9/1975 | Fujita | 292/11 |
| 4,961,601 A * | 10/1990 | Lindholm et al. | 292/216 |
| 4,974,885 A * | 12/1990 | Yokoyama | 292/201 |
| 5,048,877 A * | 9/1991 | Rogers et al. | 292/110 |
| 5,150,933 A * | 9/1992 | Myslicki et al. | 292/216 |
| 5,348,355 A * | 9/1994 | Oyha | 292/11 |
| 5,445,421 A * | 8/1995 | Ferrara | 292/216 |
| 5,618,069 A * | 4/1997 | Konchan et al. | 292/216 |
| 5,738,393 A * | 4/1998 | Chao | E05B 83/24 |
| | | | 292/216 |
| 5,853,060 A * | 12/1998 | Chao et al. | 180/69.2 |
| 5,938,254 A * | 8/1999 | Weyerstall | E05B 81/22 |
| | | | 292/144 |
| 6,106,033 A * | 8/2000 | Ruckert | E05B 83/16 |
| | | | 292/216 |
| 6,149,210 A * | 11/2000 | Hunt et al. | 292/216 |
| 6,257,657 B1 | 7/2001 | Sasaki | |
| 6,422,616 B1 * | 7/2002 | Wortmann et al. | 292/216 |
| 6,474,679 B2 * | 11/2002 | Miyasaka et al. | 280/730.1 |
| 6,499,555 B2 * | 12/2002 | Ishizaki et al. | 180/274 |
| 6,571,901 B2 * | 6/2003 | Lee | 180/274 |
| 6,581,987 B1 * | 6/2003 | Gentile et al. | 292/216 |
| 6,588,526 B1 * | 7/2003 | Polz et al. | 180/69.21 |
| 6,802,556 B2 * | 10/2004 | Mattsson et al. | 296/187.09 |
| 7,195,090 B2 * | 3/2007 | Parks et al. | 180/271 |
| 7,204,526 B2 * | 4/2007 | Seo | 292/24 |
| 7,261,337 B2 * | 8/2007 | Nakagome et al. | 292/216 |
| 7,303,040 B2 * | 12/2007 | Green et al. | 180/274 |
| 7,416,228 B2 * | 8/2008 | Pfitzinger | E05B 15/0046 |
| | | | 292/214 |
| 7,559,399 B2 * | 7/2009 | Lewis et al. | 180/274 |
| 7,845,691 B2 * | 12/2010 | Sundararajan et al. | 292/216 |
| 8,162,093 B2 * | 4/2012 | Scheuch et al. | 180/274 |
| 8,490,735 B2 * | 7/2013 | Farooq et al. | 180/274 |
| 8,573,658 B2 * | 11/2013 | Kim | 292/201 |
| 8,579,068 B2 * | 11/2013 | Farooq et al. | 180/274 |
| 8,584,787 B2 * | 11/2013 | Hwang | B60R 21/38 |
| | | | 180/274 |
| 9,033,092 B1 * | 5/2015 | Rao et al. | 180/274 |
| 2002/0014367 A1 * | 2/2002 | Sasaki et al. | 180/274 |
| 2004/0256861 A1 * | 12/2004 | Nakagome et al. | 292/95 |
| 2005/0218670 A1 * | 10/2005 | Brose | E05B 81/22 |
| | | | 292/341.16 |
| 2006/0175845 A1 * | 8/2006 | Arabia, Jr. | E05B 81/22 |
| | | | 292/341.16 |
| 2007/0200359 A1 * | 8/2007 | Lewis | B60R 21/38 |
| | | | 292/216 |
| 2007/0246944 A1 | 10/2007 | Sundararajan et al. | |
| 2009/0283347 A1 * | 11/2009 | Boggess et al. | 180/69.21 |
| 2009/0289474 A1 * | 11/2009 | Kim et al. | 296/193.11 |
| 2012/0007372 A1 * | 1/2012 | Nurmi et al. | 292/216 |
| 2012/0074715 A1 * | 3/2012 | Kim | 292/201 |
| 2013/0087401 A1 * | 4/2013 | Masih | B60R 21/38 |
| | | | 180/274 |
| 2014/0054903 A1 * | 2/2014 | Kim et al. | 292/96 |
| 2014/0138961 A1 * | 5/2014 | Hwang | 292/122 |
| 2014/0246870 A1 * | 9/2014 | Kim et al. | 292/216 |
| 2015/0076833 A1 * | 3/2015 | Rosales et al. | 292/92 |
| 2015/0076835 A1 * | 3/2015 | Mitchell et al. | 292/194 |
| 2015/0102607 A1 * | 4/2015 | Kim et al. | 292/92 |
| 2015/0115625 A1 * | 4/2015 | Park et al. | 292/194 |
| 2015/0145263 A1 * | 5/2015 | Farris et al. | 292/195 |

FOREIGN PATENT DOCUMENTS

| | | | | |
|---|---|---|---|---|
| CN | 102765426 A | | 11/2012 | |
| JP | 2002-29370 A | | 1/2002 | |
| JP | 2002-037128 A | | 2/2002 | |
| KR | 20030012256 A | * | 2/2003 | ............ B60R 22/46 |
| KR | 20030012256 A | * | 2/2003 | |
| KR | 10-2004-0110544 A | | 12/2004 | |
| KR | 10-2012-0134562 B1 | | 12/2012 | |
| KR | 10-2013-0014725 B1 | | 2/2013 | |
| KR | 10-2013-0018059 A | | 2/2013 | |
| KR | 10-2013-0028188 A | | 3/2013 | |
| KR | 10-1272519 B1 | | 6/2013 | |
| WO | WO 2013/082711 A1 | | 6/2013 | |

* cited by examiner

ACTIVE HOOD LATCH DEVICE FOR VEHICLE

CROSS-REFERENCE TO RELATED APPLICATION

The present application claims priority of Korean Patent Application Number 10-2013-0098213 filed on Aug. 20, 2013, the entire contents of which application are incorporated herein for all purposes by this reference.

BACKGROUND OF INVENTION

Field of Invention

The present disclosure relates to an active hood latch device for a vehicle to reduce a pedestrian injury value by uniformly lifting up a front end portion of a hood of a vehicle in case of a pedestrian collision accident.

Description of Related Art

A hood of a vehicle is a part which opens or closes an engine compartment of the vehicle and blocks noises of an engine. Recently, an active hood system has been used for a vehicle.

The active hood system lifts up the hood to protect a pedestrian in case of a pedestrian collision accident. Upon occurrence of the pedestrian collision accident, the active hood system lifts up the hood and prevents a secondary shock between a head part of the pedestrian and an engine part of the hood, thereby reducing a pedestrian injury value. Thus, the active hood system may be called a sort of pedestrian protection safety device.

To respond to pedestrian protection regulations which have been recently strengthened in relation to vehicles, vehicle manufacturers have studied on an active hood latch for uniformly lifting up, by popping up, a front end portion of a hood, among techniques related to the active hood system as part of pedestrian protection techniques.

A conventional active hood latch is structured to lift up a front end portion of a hood by directly lifting up multiple parts among components. However, the active hood latch has a complex structure, resulting in excessive cost, weight, and size and thus degrading mass production.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, various aspects of the present invention provide an active hood latch device for a vehicle, which may actively reduce a pedestrian injury value by uniformly lifting up a front end portion of a hood of the vehicle by directly popping up a striker in case of a pedestrian collision accident.

According to one of various aspects of the present invention, there is provided an active hood latch device for a vehicle for lifting a front end portion of a hood of the vehicle, the active hood latch device including an actuator for generating power for lifting up a striker locked by a passive latch, an actuator cooperating portion installed to connect the striker with the actuator and to lift up the striker in cooperation with the actuator when the actuator operates, and an electronic controller for operating the actuator upon receiving a sensing signal from a collision sensor that senses pedestrian collision.

For example, the actuator may be a gunpowder cylinder device that moves a piston forward by an explosion force when gunpowder in the actuator explodes, and a front end portion of the piston may be positioned in adjacent to a side of the actuator cooperating portion.

The actuator cooperating portion may include a release bracket that is adjacent to a side of the actuator to cooperate with the actuator and a popup guide that is positioned under the striker and is adjacent to a side of the release bracket to cooperate with the release bracket, and when the actuator operates, the popup guide may rotate in a direction to push up the striker.

The active hood latch device may include an emergency claw for locking or unlocking a latch guide pin of the passive latch, in which the emergency claw is rotatably assembled on a mounting base. The emergency claw may be supported by a popup guide of the actuator cooperating portion to prevent unintentional rotation that unlocks the latch guide pin, and the emergency claw may be installed such that a claw return spring is installed in a compressed form in a rotation axis of the emergency claw.

The passive latch may be rotatably assembled on a mounting base, with a latch guide pin of the passive latch moving along a guide hole formed in the mounting base.

The popup guide may be installed such that a guide rotation-preventing spring is installed in a compressed form in a rotation axis of the popup guide, and the guide rotation-preventing spring may exert a spring force in an opposite direction to a direction of rotation that occurs when the actuator operates.

The release bracket may be installed such that a bracket rotation-preventing spring is installed in a compressed form in a rotation axis of the release bracket, and the bracket rotation-preventing spring may exert a spring force in an opposite direction to a direction of rotation that occurs when the actuator operates.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an active hood latch device which uniformly or substantially uniformly lifts up a hood by popping up a hood striker of a vehicle, such that in case of a pedestrian collision accident, the striker locked by a passive latch is directly popped up to rotate the passive latch and lift up a front end portion of the hood, thus implementing optimal performance.

Figure 1:
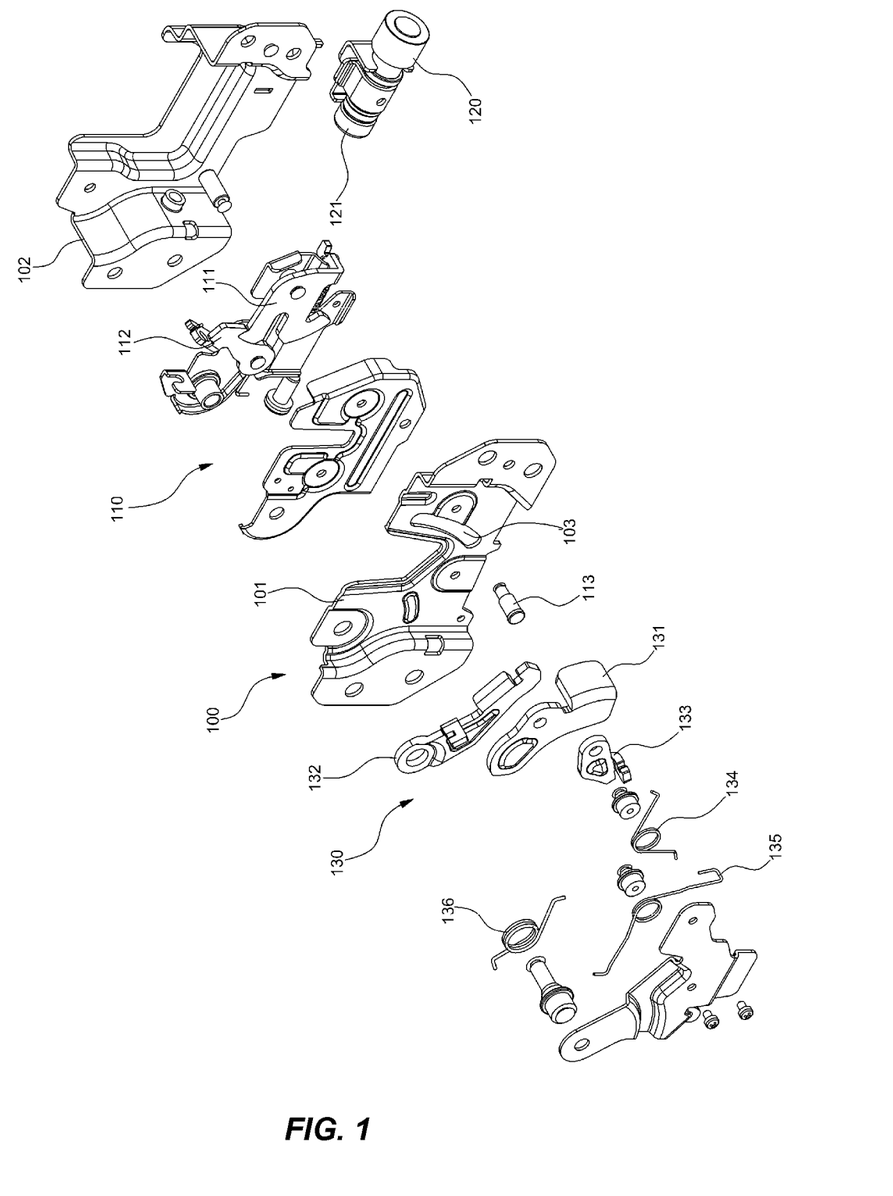
FIG. 1 is an exploded perspective view showing an active hood latch device for a vehicle according to the present invention.
Figure 2A:
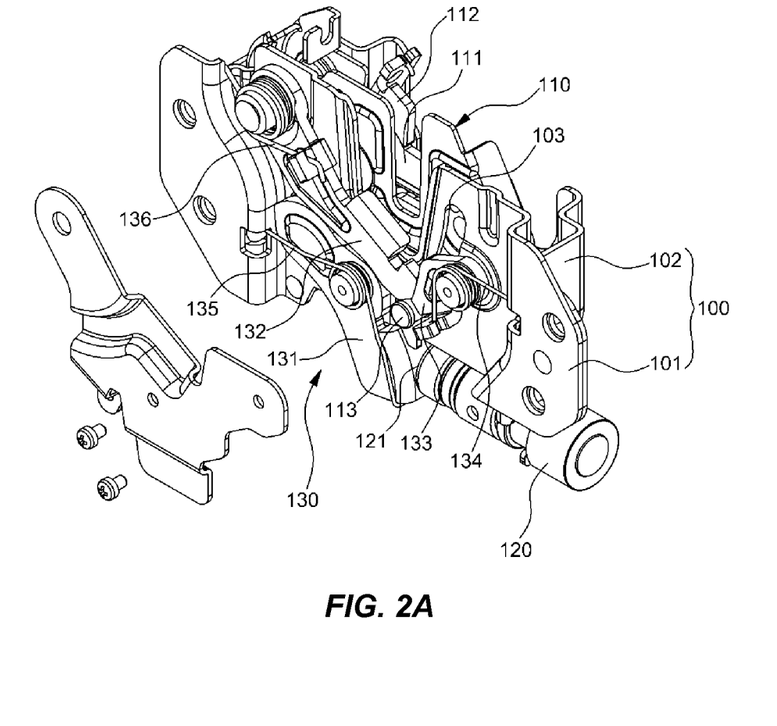
FIGS. 2A and 2B are assembled perspective views showing an active hood latch device for a vehicle according to the present invention.
Figure 2B:
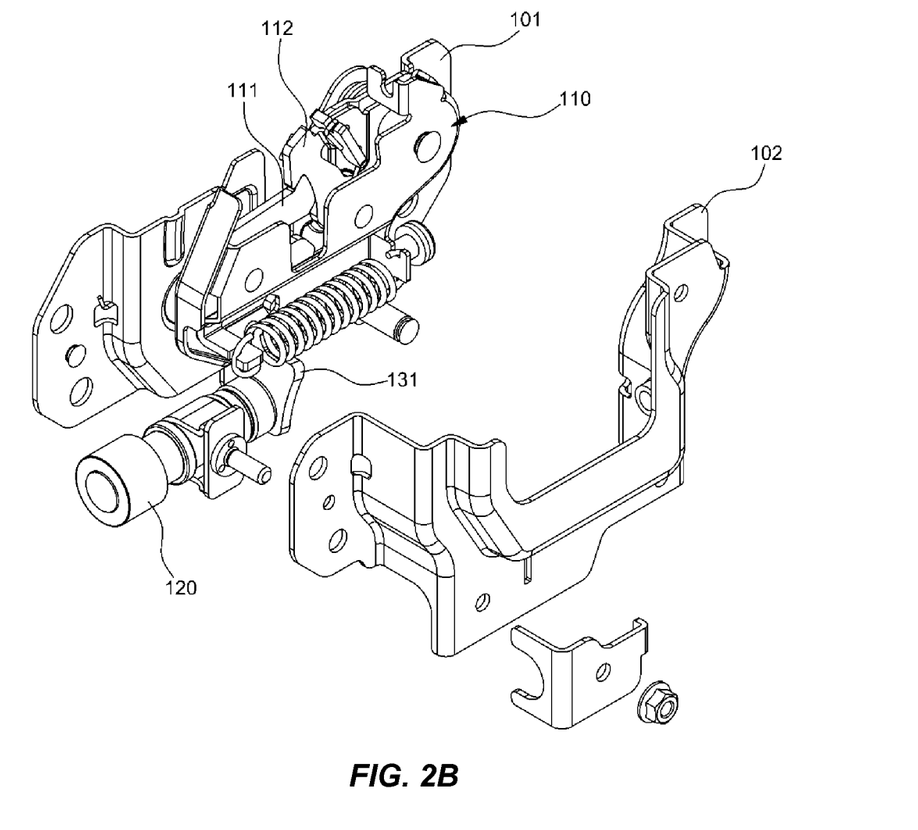

As shown in FIGS. 1 through 2B, an active hood latch device for a vehicle according to the present invention includes a passive latch 110 that holds and fixes (e.g., locks) a striker of a front end portion of a hood (or a hood striker) S, an actuator 120 that generates power for lifting up the striker S, an actuator cooperating portion 130 that receives power of the actuator 120 and cooperates with the actuator 120 to lift up the striker S, and an electronic controller 138 that generates a control signal for operating the actuator 120.

The passive latch 110 is structured to lock and unlock the hood striker S. To this end, the passive latch 110 is installed on a mounting base 100, which is mounted in an inner side of a front end portion of an engine compartment, in a way to move up and down. The mounting base 100 includes a front mounting plate 101 and a rear mounting plate 102 that are coupled with the passive latch 110 therebetween.

Figure 3:
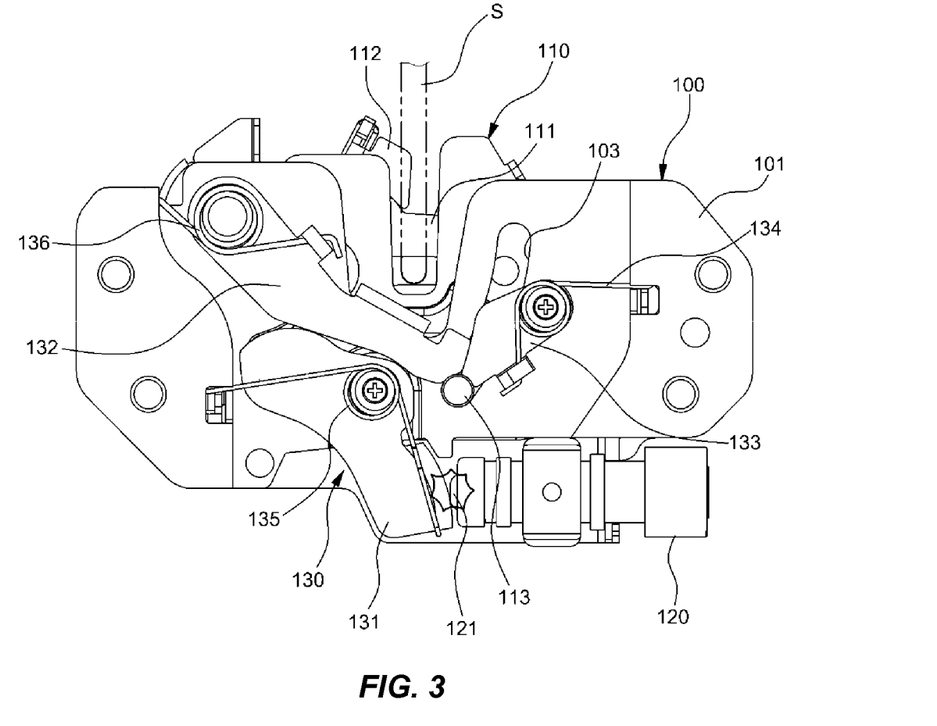
FIGS. 3 through 5 show an operation process of an active hood latch device according to the present invention.

As shown in FIG. 3, the passive latch 110 is assembled to a side of the mounting base 100 in a way to rotate when being in a lock state of holding and fixing a side of a lower end of the striker S. To this end, the passive latch 110 may include claw 111 for holding and fixing the side of the lower end of the striker S and Pawl 112 for locking and unlocking the claw 111.

Herein, the passive latch 110 in the lock state of holding the striker S is lifted up together with the striker S when the striker S is lifted up, and thus the passive latch 110 may be a well-known latch for locking and unlocking the striker S, and the present invention is not limited by this structure.

The actuator 120 delivers power generated during operation to the actuator cooperating portion 130 to lift up the hood striker S. Thus, when the actuator 120 operates, left and right sides of the actuator 120 may be longitudinally extended and the actuator 120 is mounted in a side of a lower end portion of the mounting base 100 to operate its adjacent operator cooperating portion 130.

The actuator 120 generates an operating force of the actuator cooperating portion 130 by exploding gunpowder therein when the electronic controller outputs a control signal. For example, a gunpowder-type oscillator, such as a gunpowder-type cylinder device may be used as a gunpowder-type actuator. The actuator 120 operates the actuator cooperating portion 130 by explosion of gunpowder that occurs when the electronic controller outputs a control signal.

When the actuator 120 is structured as a gunpowder-type cylinder device in which a front end of a piston 121 is directly adjacent to the actuator cooperating portion 130 as shown in FIG. 2A, the piston 121 moves forward by an explosion force generated when the internal gunpowder explodes, and at the same time, operates the actuator cooperating portion 130.

The actuator cooperating portion 130 is installed to connect the hood striker S and the actuator 120, thus lifting up the striker S of the front end portion of the hood in cooperation with the operating actuator 120. To this end, the actuator cooperating portion 130 includes a release bracket 131 and a popup guide 132.

The release bracket 131 is adjacent to the front end portion of the piston 121 of the actuator 120 for cooperation, and is rotatably assembled to a side of an intermediate portion of the front mounting plate 101. A side end of the release bracket 131 is adjacent to the front end portion of the piston 121 of the actuator 120, and the other side end of the release bracket 131 is adjacent to a side of the popup guide 132.

Figure 4:
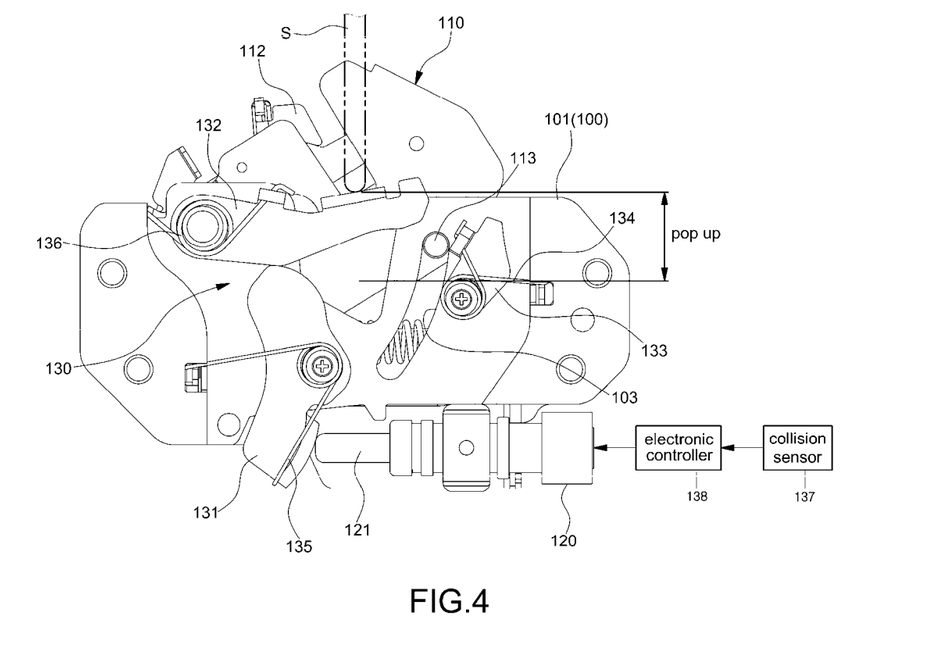

As shown in FIG. 4, the release bracket 131 is pushed by the piston 121 that moves forward to the left and to the right in gunpowder explosion in the actuator 120 such that the release bracket 131 rotates in a predetermined direction. Thus, the popup guide 132 rotates in cooperation with the release bracket 131 to lift up the striker S.

The popup guide 132 is positioned under the hood striker S and is adjacent to the release bracket 131 in cooperation with the release bracket 131. Thus, the popup guide 132 is rotatably assembled to a side of an upper end portion of the front mounting plate 101 and a side of the popup guide 132 is positioned close to the lower portion of the strike S in adjacent to a side end of the release bracket 131. The popup guide 132 cooperates with the operation of the release bracket 131 that rotates in a predetermined direction during operation of the actuator 120 to push up and lift up the striker S.

Upon occurrence of pedestrian collision, to lift up the striker S, the electronic controller 138 receives a sensing signal from a collision sensor 137 for sensing pedestrian collision. That is, the electronic controller 138 outputs a control signal for operating the actuator 120, and upon receiving a sensing signal from the collision sensor 137 for sensing pedestrian collision, outputs the control signal to operate the actuator 20.

An emergency claw 133 for locking and unlocking rotation of the passive latch 110 is adjacent to a side end of the popup guide 132. The emergency claw 133 is rotatably assembled to a side of the front mounting plate 101 (e.g., a position adjacent to an upper portion of the actuator 120) in the form of holding and fixing the latch guide pin 113 of the passive latch 110 (or blocking and interrupting a moving path). When collision with a pedestrian does not occur, a lock state in which rotation is blocked by the popup guide 132 is maintained. When collision with a pedestrian occurs, the popup guide 132 rotates in a direction to lift up the striker S, thus entering an unlock state.

The emergency claw 133 has a claw return spring 134 in a compressed state in its rotation axis. Thus, as shown in FIG. 4, locking by the popup guide 132 is released, and at the same time, the emergency claw 133 rotates in a predetermined direction by means of a spring force, thus unlocking the latch guide pin 113. That is, the emergency claw 133 is installed rotatably in a side of the front mounting plate 101 in a state where rotation of the emergency claw 133 is prevented by the popup guide 132.

Figure 5:
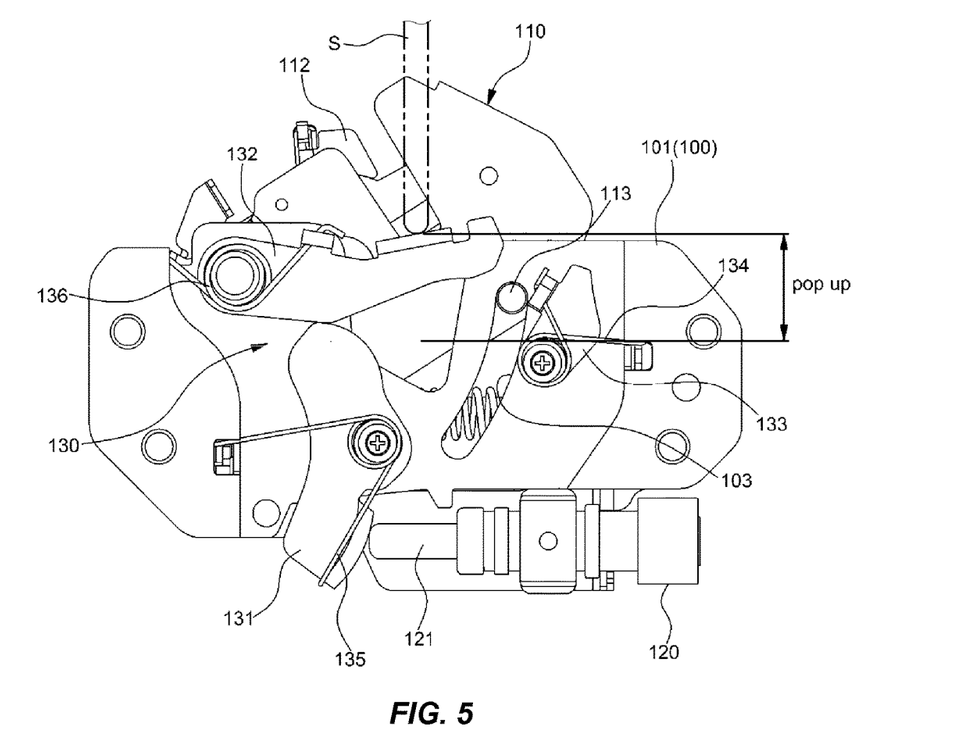

The latch guide pin 113 guides and controls a rotation section of the passive latch 110 according to lifting movement of the striker S, and as shown in FIG. 5, the latch guide pin 113 is assembled to move along a guide hole 103 of the front mounting plate 101, thus preventing the popup guide 132 from excessively lifting up the striker S.

The latch guide pin 113 is assembled to a side of the passive latch 110 (e.g., an opposite side of a rotation axis), such that the latch guide pin 113 is assembled through the guide hole 103 that is formed in a side of the front mounting plate 101 and moves upwardly along the guide hole 103 when being unlocked.

The aforementioned active hood latch device further includes a guide rotation-preventing spring 136 and a bracket rotation-preventing spring 135 to prevent an unintended operation when collision of a pedestrian does not occur.

The guide rotation-preventing spring 136 is intended to prevent rotation of the popup guide 132 when the actuator 120 does not operate. Thus, the guide rotation-preventing spring 136 is installed in a hinge pin of the popup guide 132 (rotation axis) in a compressed form.

The bracket rotation-preventing spring 135 is intended to prevent rotation of the release bracket 131 when the actuator 120 does not operate. Thus, the bracket rotation-preventing spring 135 is installed in a hinge pin of the release bracket 131 (rotation axis) in a compressed form.

Thus, when the actuator 120 does not operate, a spring force is exerted to the popup guide 132 and the release bracket 131 in an opposite direction to a direction of rotation that occurs when the actuator 120 operates (or the striker S is lifted up), such that rotation caused by an external force is prevented and thus an unintended lift of the striker S is prevented.

The active hood latch device for a vehicle structured as described above operates in the following manners in case of a pedestrian collision accident.

In case of a pedestrian collision accident, the collision sensor senses vehicle forward collision and forwards a pedestrian collision sensing signal to the electronic controller. Then, as shown in FIG. 3, the release bracket 131 is rotated by power (explosion force) of the actuator 120 and the popup guide 132 is rotated to push up and lift up the striker S. In this case, the passive latch 110 holding the striker S is rotated and moves upward, thus lifting up a front end portion of the hood by the amount of popup.

The active hood latch according to the present invention structurally separates a function of holding the striker and a function of popping up the striker, and directly pops up the striker, thus improving operation performance associated with the amount of popup, a popup force, and a operating speed and securing robustness.

The active hood latch device for a vehicle according to the present invention allows the number of parts and size reduction and cost and weight reduction and optimizes hood popup performance.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active hood latch device for a vehicle for lifting a front end portion of a hood of the vehicle, the active hood latch device comprising:
    a mounting base;
    an actuator for generating power for lifting up a striker locked by a passive latch;
    an actuator cooperating portion installed on the mounting base to connect the striker with the actuator and to lift up the striker in cooperation with the actuator when the actuator operates;
    a latch guide pin fixed on a side of the passive latch;
    an electronic controller for operating the actuator upon receiving a sensing signal from a collision sensor sensing a pedestrian collision; and
    an emergency claw for locking or unlocking the latch guide pin of the passive latch, wherein the emergency claw is rotatably assembled on the mounting base,
    wherein the actuator cooperating portion comprises:
        a release bracket pivotally mounted on the mounting base and cooperating with the actuator; and
        a popup guide pivotally mounted on the mounting base under the striker, wherein the popup guide is separated from the release bracket, and is engaged with the release bracket by a rotation force of the release bracket when the actuator operates the release bracket and rotates the pop up guide by a power of the actuator transferred through the release bracket, such that the popup guide rotates in a direction to push up the striker and wherein the popup guide is selectively engaged to the latch guide pin to prevent the strike from lifting up beyond a predetermined distance which is determined by a rotation distance of the passive latch, and
    wherein the passive latch includes:
        a claw for holding and fixing a side of the striker; and
        a pawl for locking and unlocking the claw,
    wherein the claw in a lock state of holding the striker is lifted up together with the striker by the popup guide and is rotated to hold the striker while the striker is lifted up in the predetermined distance by the popup guide according to operation of the actuator.

2. The active hood latch device of claim 1, wherein the actuator is a gunpowder cylinder device that moves a piston forward by an explosion force when gunpowder in the actuator explodes, and a front end portion of the piston is positioned adjacent to a side of the actuator cooperating portion.

3. The active hood latch device of claim 1, wherein the actuator cooperating portion comprises the release bracket adjacent to a side of the actuator and the popup guide positioned under the striker and is adjacent to a side of the release bracket.

4. The active hood latch device of claim 1, wherein the emergency claw is supported by a popup guide of the actuator cooperating portion to prevent unintentional rotation that unlocks the latch guide pin.

5. The active hood latch device of claim 1, wherein the emergency claw is installed such that a claw return spring is installed in a compressed form in a rotation axis of the emergency claw.

6. The active hood latch device of claim 1, wherein the passive latch is rotatably assembled on the mounting base, with the latch guide pin of the passive latch moving along a guide hole formed in the mounting base.

7. The active hood latch device of claim 1, wherein the popup guide is installed such that a guide rotation-preventing spring is installed in a compressed form in a rotation axis of the popup guide, and the guide rotation-preventing spring exerts a spring force in an opposite direction to a direction of rotation that occurs when the actuator operates.

8. The active hood latch device of claim 1, wherein the release bracket is installed such that a bracket rotation-preventing spring is installed in a compressed form in a rotation axis of the release bracket, and the bracket rotation-preventing spring exerts a spring force in an opposite direction to a direction of rotation that occurs when the actuator operates.

9. The active hood latch device of claim 4, wherein the emergency claw is installed such that a claw return spring is installed in a compressed form in a rotation axis of the emergency claw.

* * * * *